(12) United States Patent
Gibble et al.

(10) Patent No.: US 6,895,466 B2
(45) Date of Patent: May 17, 2005

(54) APPARATUS AND METHOD TO ASSIGN PSEUDOTIME ATTRIBUTES TO ONE OR MORE LOGICAL VOLUMES

(75) Inventors: Kevin L. Gibble, Tucson, AZ (US); Gregory T. Kishi, Oro Valley, AZ (US); Jonathan W. Peak, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 10/230,831

(22) Filed: Aug. 29, 2002

(65) Prior Publication Data

US 2004/0044845 A1 Mar. 4, 2004

(51) Int. Cl.[7] .............................................. G06F 12/00
(52) U.S. Cl. ..................... 711/112; 711/133; 711/134; 711/135; 711/136; 711/161; 711/162; 709/231; 709/232; 707/204; 714/6; 714/7
(58) Field of Search ................... 707/204, 1; 709/231, 709/232, 245; 711/112, 133, 134, 135, 161, 162; 714/6, 7

(56) References Cited

U.S. PATENT DOCUMENTS

| | | | |
|---|---|---|---|
| 4,636,946 A | 1/1987 | Hartung et al. ............. 364/200 |
| 4,876,662 A | 10/1989 | Pence ........................ 364/900 |
| 5,125,086 A | 6/1992 | Perazzoli, Jr. .............. 395/425 |
| 5,155,835 A | 10/1992 | Belsan ....................... 395/425 |
| 5,418,921 A | 5/1995 | Cortney et al. ............. 395/425 |
| 5,491,810 A | 2/1996 | Allen ......................... 395/444 |
| 5,493,663 A | 2/1996 | Parikh ........................ 395/486 |
| 5,537,585 A | 7/1996 | Blickenstaff et al. ....... 395/600 |
| 5,542,066 A | 7/1996 | Mattson et al. ............. 395/463 |
| 5,551,002 A | 8/1996 | Rosich et al. ............... 395/461 |
| 5,650,969 A | 7/1997 | Niijima et al. .............. 365/200 |
| 5,664,187 A | 9/1997 | Burkes et al. ............... 395/621 |
| 5,727,181 A | 3/1998 | Beglin et al. ............... 395/441 |
| 5,745,778 A | 4/1998 | Alfieri ..................... 395/800.01 |
| 5,784,698 A | 7/1998 | Brady et al. ................ 711/171 |
| 5,875,454 A | 2/1999 | Craft et al. ................. 711/113 |
| 6,003,114 A | 12/1999 | Bachmat ..................... 711/113 |
| 6,012,126 A | 1/2000 | Aggarwal et al. .......... 711/133 |
| 6,067,608 A | 5/2000 | Perry ......................... 711/203 |
| 6,141,731 A | 10/2000 | Beardsley et al. .......... 711/136 |
| 6,141,737 A | 10/2000 | Krantz et al. ............... 711/717 |
| 6,192,450 B1 | 2/2001 | Bauman et al. ............. 711/135 |
| 6,266,742 B1 | 7/2001 | Challenger et al. ......... 711/133 |
| 6,269,423 B1 | 7/2001 | Kishi .......................... 711/113 |
| 6,311,252 B1 | 10/2001 | Raz ............................ 711/117 |
| 6,336,163 B1 | 1/2002 | Brewer et al. .............. 711/112 |
| 2001/0054133 A1 | 12/2001 | Murotani et al. ........... 711/114 |
| 2002/0040419 A1 | 4/2002 | Nishikawa et al. ......... 711/114 |
| 2002/0069280 A1 * | 6/2002 | Bolik et al. ................. 709/225 |
| 2004/0044851 A1 * | 3/2004 | Dawson et al. ............. 711/154 |

* cited by examiner

Primary Examiner—Mano Padmanabhan
Assistant Examiner—Mehdi Namazi
(74) Attorney, Agent, or Firm—Dale F. Regelman

(57) ABSTRACT

A method to assign a premigration pseudotime attribute and a stubbing pseudotime attribute to a logical volume. The method defines a plurality of host requests, and associates with each host request a pseudotime range. The method further maintains a logical volume in a first information storage medium at a first time, and determines if a user provides a host request for that logical volume. If a user provides a host request for that logical volume, then the method assigns to the logical volume a premigration pseudotime attribute, and a stubbing pseudotime attribute, comprising a time within the pseudotime range associated with the host request. If, on the other hand, a user does not provide a host request for the logical volume, then the method assigns to that logical volume the first time as said premigration pseudotime attribute, and said first time as said stubbing pseudotime attribute. The method saves the assigned premigration pseudotime attribute and the assigned stubbing pseudotime attribute for later use.

55 Claims, 7 Drawing Sheets

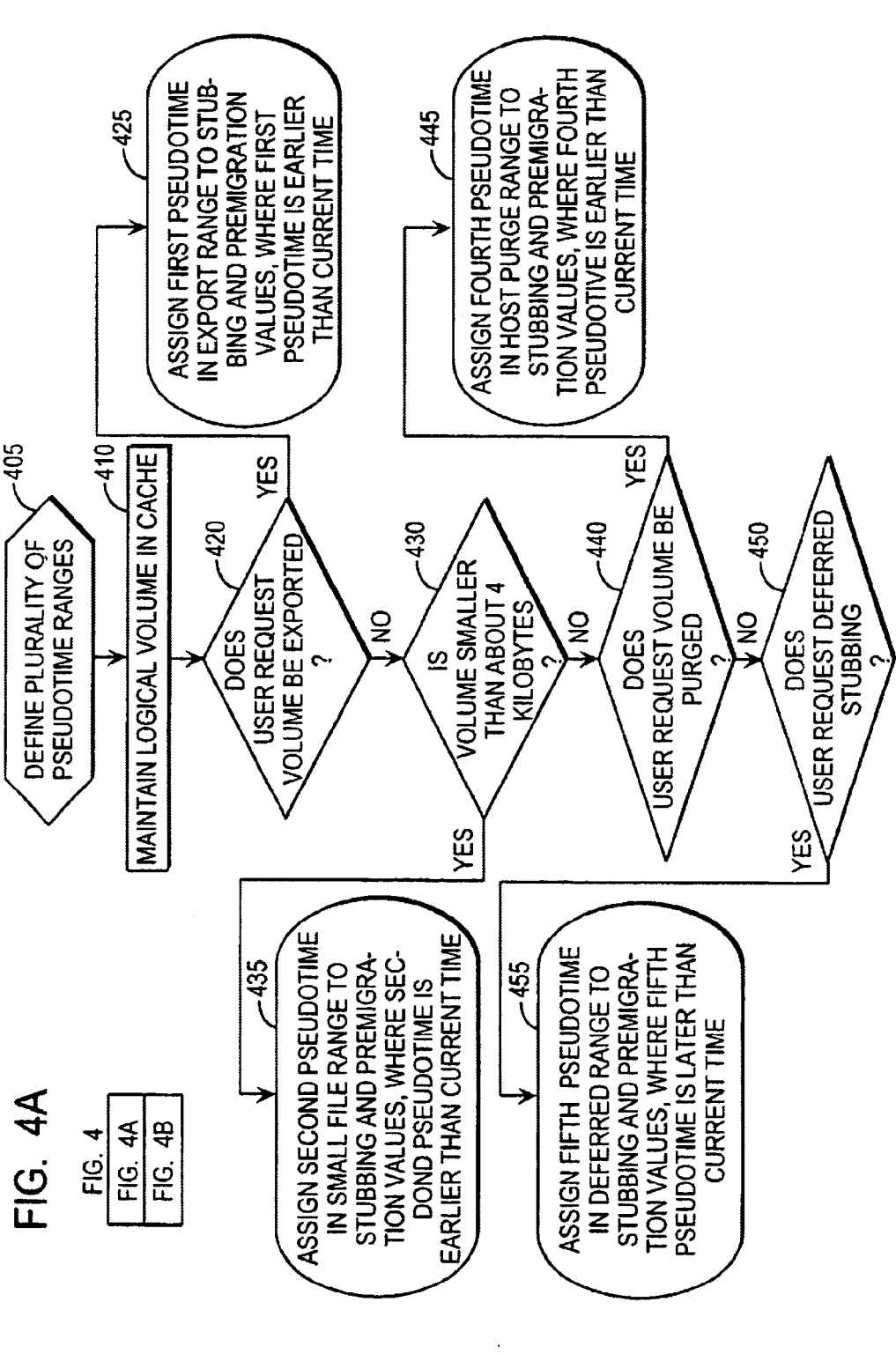

APPARATUS AND METHOD TO ASSIGN PSEUDOTIME ATTRIBUTES TO ONE OR MORE LOGICAL VOLUMES

FIELD OF THE INVENTION

Applicant's invention relates to an apparatus and method to assign pseudotime attributes to one or more logical volumes disposed in an information storage medium. In certain embodiments, the information storage medium is disposed in a virtual tape system.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus to assign a premigration pseudotime attribute and a stubbing pseudotime attribute to a logical volume. Applicants' method defines a plurality of host requests, and associates with each host request a pseudotime range. Applicants' method further maintains a logical volume in a first information storage medium at a first time, and determines if a user provides a host request for that logical volume.

If a user provides a host request for that logical volume, then Applicants' method assigns to the logical volume a premigration pseudotime attribute, and a stubbing pseudotime attribute, comprising a time within the pseudotime range associated with the host request. If, on the other hand, a user does not provide a host request for the logical volume, then Applicants' method assigns to that logical volume the first time as said premigration pseudotime attribute, and said first time as said stubbing pseudotime attribute. Applicants' method saves the assigned premigration pseudotime attribute and the assigned stubbing pseudotime attribute for later use.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
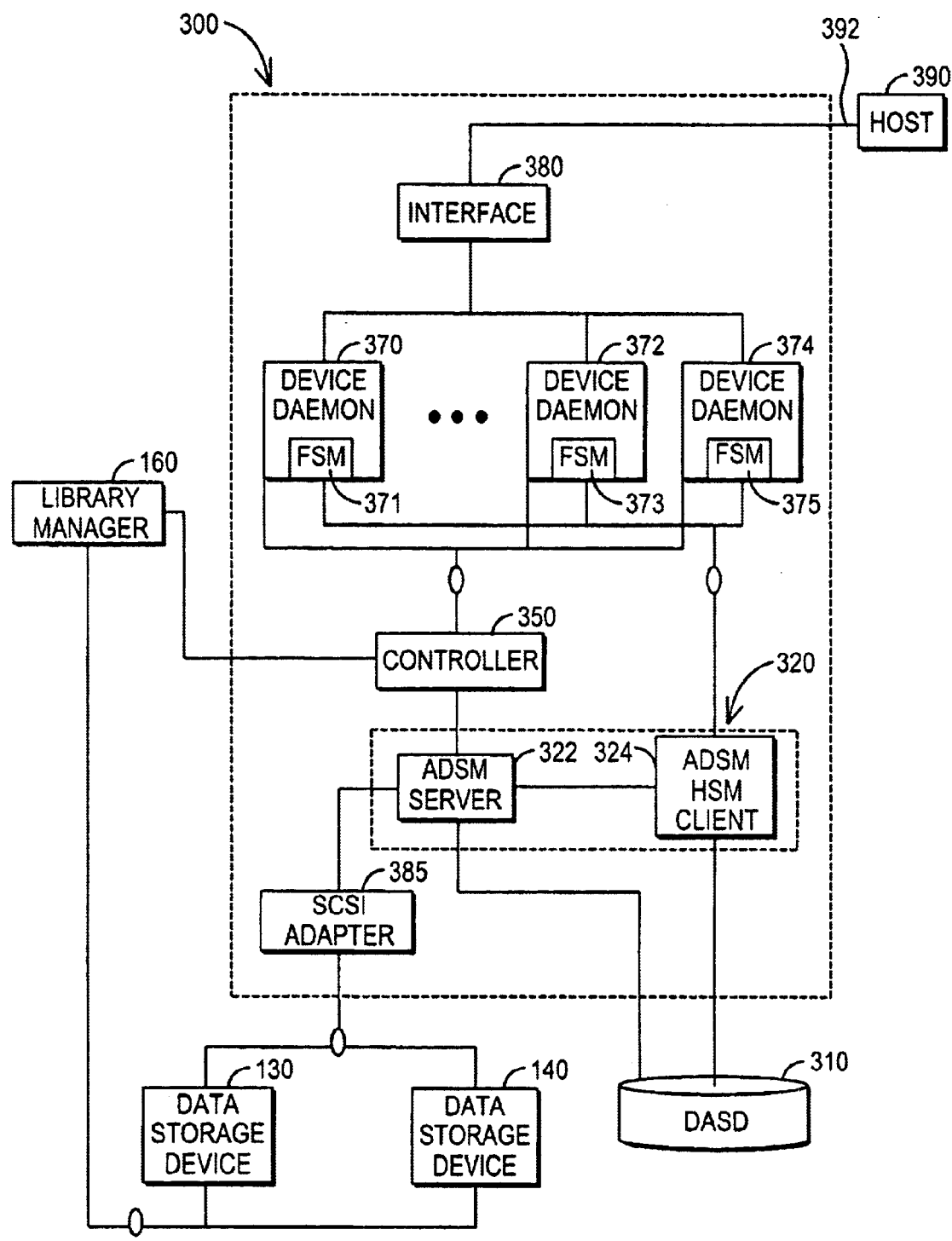
FIG. 3 is a block diagram showing the components of Applicants' virtual tape server.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390.

In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 136 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "Z/OS V1R3 DFSMS Introduction," IBM document no. SC26-7397-01 2002, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
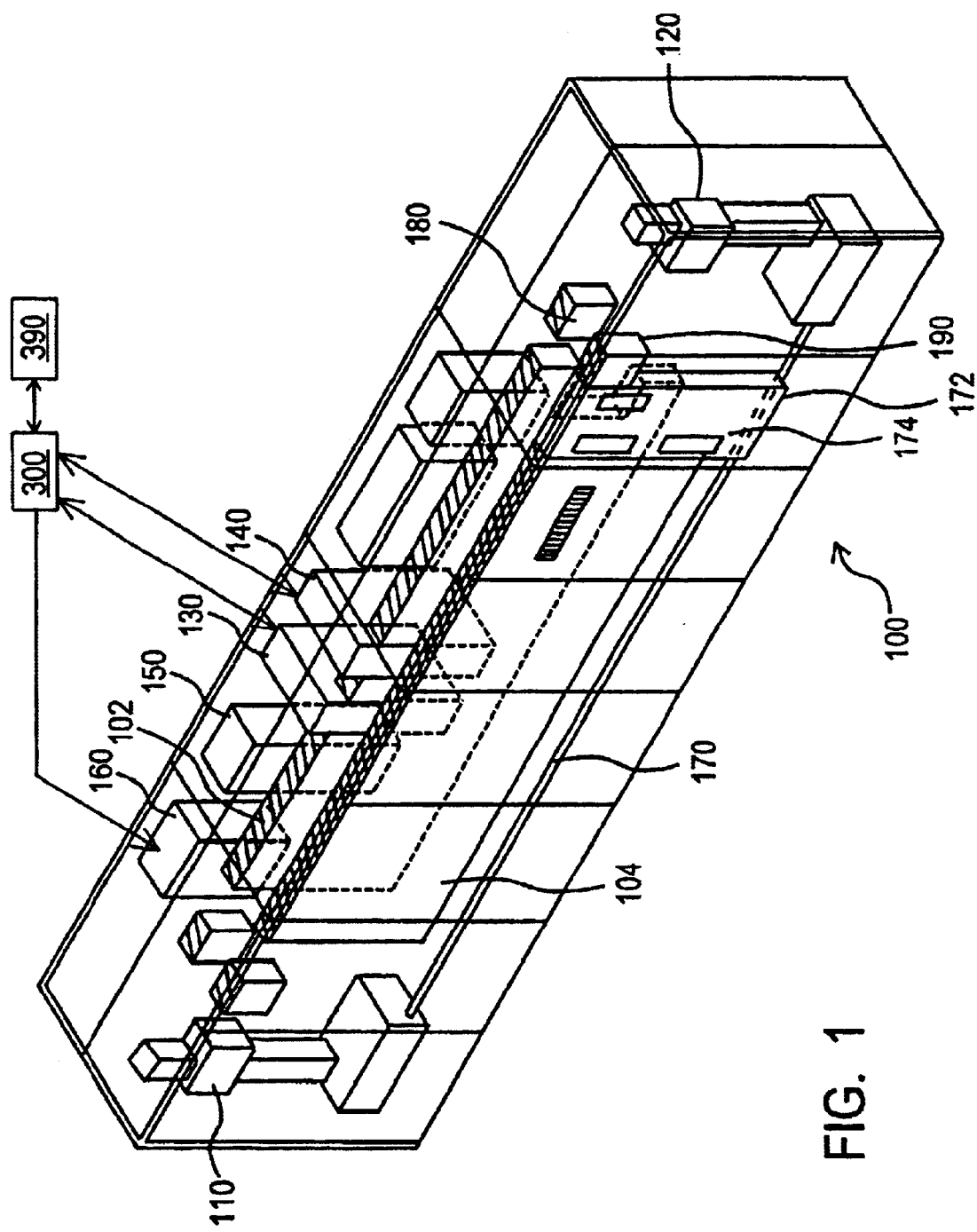
FIG. 1 is a perspective view of a first embodiment of Applicant's data storage and retrieval system.
Figure 2:
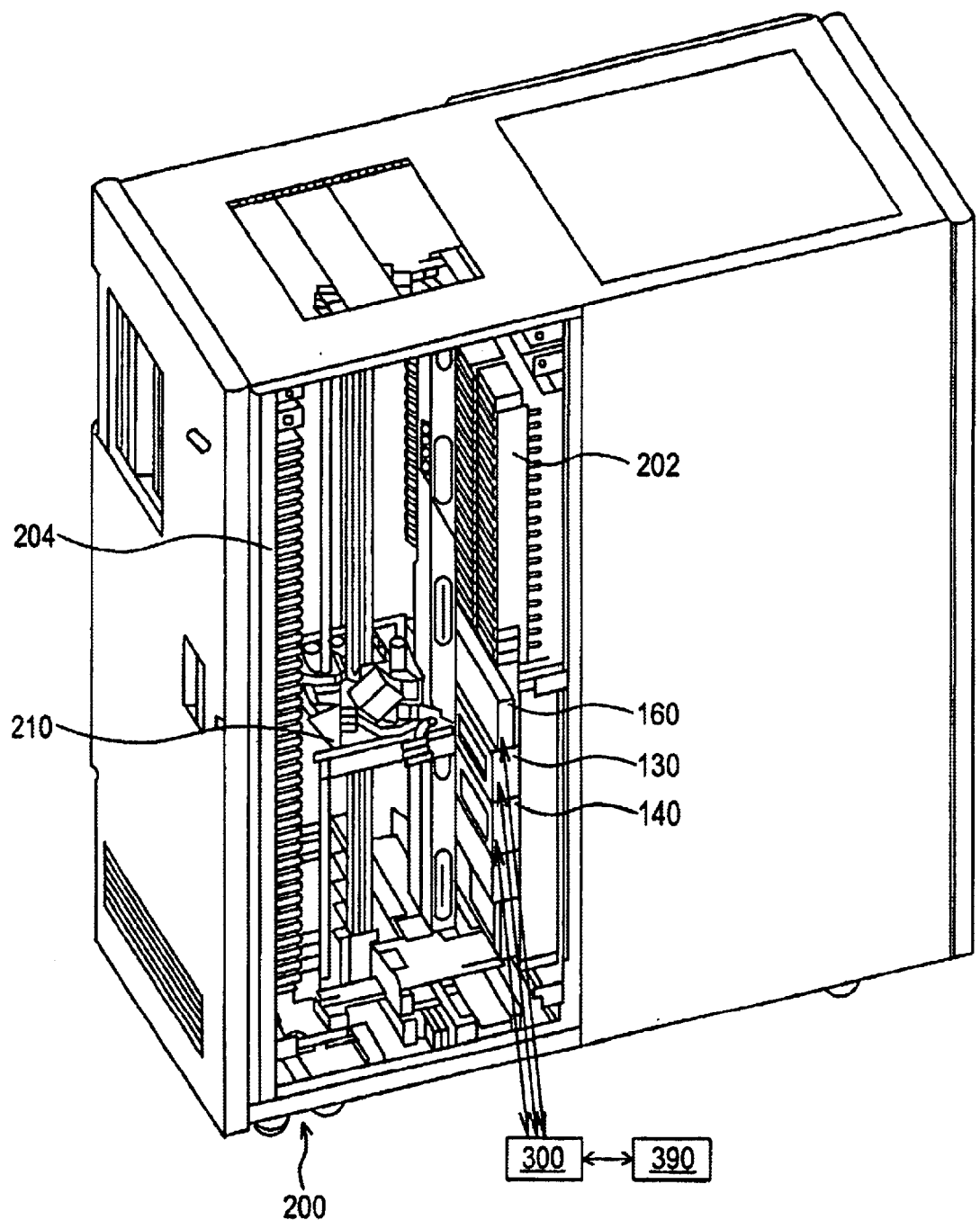
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Referring again to FIG. 3, virtual volumes that are frequently accessed by host 390 are maintained in DASD 310. Therefore, at any given time a plurality of virtual volumes are stored in DASD 310. In order to make DASD space available for new logical volumes, periodically one or more current logical volumes must be removed from the DASD. Virtual volumes that are less frequently accessed are written to one or more second information storage media using, for example, data storage devices 130/140. Such second information storage media include magnetic storage media, optical storage media, electronic storage media, and combinations thereof.

Prior art methods assign a timestamp to each logical volume, where that timestamp comprises the time the logical volume was last accessed. Using prior art methods, logical volumes are removed from the DASD using a Least Recently Used ("LRU") protocol wherein the logical volumes are removed from an information storage medium based upon the chronological order of their respective timestamps.

In contrast, Applicants' method includes a plurality of defined host requests. Each of these defined host requests is assigned a "pseudotime" range. In certain embodiments, such pseudotime ranges include an export range, a small file range, a primary premigrated range, a host purge range, a deferred range, a keep until access range, and a keep until expire range.

Logical volumes assigned premigration and stubbing pseudotimes in certain of these ranges, including the export range, the small file range, the primary premigration range, and the host purge range, are preferentially removed from the DASD. These logical volumes are assigned early pseudotimes. Other logical volumes assigned premigration and stubbing pseudotimes in other ranges, such as the deferred range, the keep until access range, and the keep until expire range, are preferentially maintained on the DASD. These logical volumes are assigned later pseudotimes. Therefore using Applicants' method, certain logical volumes are removed from the DASD, or alternatively, maintained in the DASD, without regard to their respective timestamps. Other logical volumes are removed based upon their respective timestamps, i.e. using an LRU protocol.

Prior to removing a logical volume from the DASD, that logical volume is first written to one or more physical volumes. This process is sometimes referred as "premigrating" the logical volume. After a logical volume has been premigrated, that logical volume is "stubbed" from the DASD. Stubbing means removing the logical volume from the DASD, and maintaining a pointer in the DASD which indicates, inter alia, the one or more second information storage media, i.e. physical volumes, to which the logical volume is written.

Figure 4B:
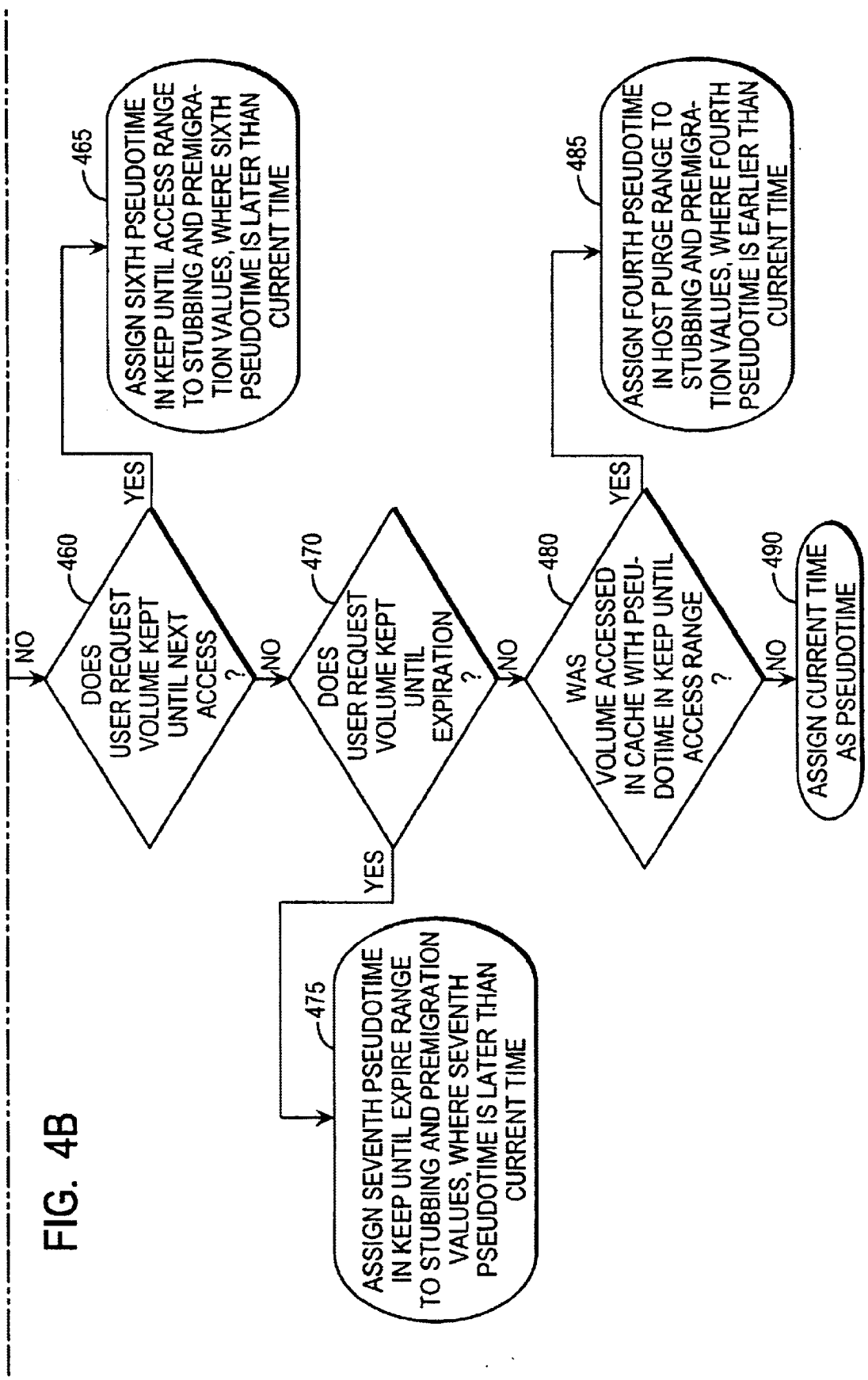
FIG. 4 is a flow chart summarizing the steps in one embodiment of Applicants' method.

FIG. 4 summarizes Applicants' method to assign a premigration pseudotime attribute and a stubbing pseudotime attribute to one or more logical volumes maintained in an information storage medium. In certain embodiments, the premigration pseudotime assigned to a logical volume and the stubbing pseudotime assigned to that same logical volume, are substantially the same. By substantially the same, Applicants' mean within about plus or minus ten percent (10%). In other embodiments, the premigration pseudotime assigned to a logical volume and the stubbing pseudotime assigned to that same logical volume, differ.

In certain embodiments, the information storage medium is disposed in a virtual tape server, such as VTS 300 (FIGS. 1, 2, 3). In certain embodiments, the information storage medium comprises one or more direct access storage device file buffers, such as DASD 310, disposed in a virtual tape system. In certain embodiments, the DASD is integral with a virtual tape server, such as VTS 300. In certain embodiments, the DASD is integral with a host computer, such as host computer 390 (FIGS. 1, 2, 3). In certain embodiments, the DASD is integral with a data storage and retrieval system, such as system 100 (FIG. 1) or system 200 (FIG. 2).

Referring now to FIG. 4, in step 405 Applicants' method defines a plurality of pseudotime ranges. In certain embodiments, one or more of Applicants' pseudotime ranges comprise times earlier than a first time. In certain embodiments, one or more of Applicants' pseudotime ranges comprise times later than the first time. In certain embodiments, the first time is the current time. In certain embodiments, the first time and the current time differ. In certain embodiments, Applicants' method includes defining an export range, a small file range, a primary premigrated range, a host purge range, a deferred range, a keep until access range, and a keep until expire range.

In step 410, Applicants' method maintains a logical volume in an information storage medium. In certain embodiments, the logical volume is maintained in a virtual tape system. In certain embodiments, the logical volume of step 410 is maintained in a DASD device, such as DASD 310 (FIG. 3), disposed in a virtual tape system.

In step 420, Applicants' method determines if a user requests the logical volume be exported to a different information storage medium. In certain embodiments, the user of step 420 comprises a host computer. In certain embodiments, the request of step 420 is provided using an operator input station, such as operator input station 150 (FIG. 1). If Applicants' method determines in step 420 that a user requests the logical volume be exported, then Applicants' method transitions from step 420 to step 425 wherein Applicants' method assigns a first pseudotime to the logical volume, where that first pseudotime is earlier than the a first time, i.e. the current time, and where the export range includes that first pseudotime.

If Applicants' method determines in step 420 that a user does not request the logical volume be exported, then Applicants' method transitions from step 420 to step 430 wherein Applicants' method determines if the logical volume is smaller than about 4 kilobytes in size. If Applicants' method determines in step 430 that the logical volume is smaller than about 4 kilobytes in size, then Applicants' method transitions from step 430 to step 435 wherein Applicants' method assigns a second pseudotime to the logical volume, where that second pseudotime is earlier than a first time, i.e. the current time, and where the small file range includes that second pseudotime.

If Applicants' method determines in step 430 that the logical volume is not smaller than about 4 kilobytes in size, then Applicants' method transitions from step 430 to step 440 wherein Applicants' method determines if the user requests the logical volume be purged. In certain embodiments, the user of step 440 comprises a host computer. In certain embodiments, the request of step 440 is provided using an operator input station, such as operator input station 150 (FIG. 1). If Applicants' method determines in step 440 that the user requests the logical volume be purged, then-Applicants' method transitions from step 440 to step 445 wherein Applicants' method assigns a fourth pseudotime to the logical volume, where that fourth pseudotime is earlier than the first time, but later than the first pseudotime and the second pseudotime, and where the host purge range includes that fourth pseudotime.

If Applicants' method determines in step 440 that the user does not request the logical volume be purged, then Applicants' method transitions from step 440 to step 450 wherein Applicants' method determines if the user requests deferred stubbing for the logical volume. In certain embodiments, the user of step 450 comprises a host computer. In certain embodiments, the request of step 450 is provided using an operator input station, such as operator input station 150 (FIG. 1). If Applicants' method determines in step 450 that the user requests deferred stubbing for the logical volume, then Applicants' method transitions from step 450 to step 455 wherein Applicants' method assigns a fifth pseudotime to the logical volume, where that fifth pseudotime is later than the first time, and where the deferred range includes that fifth pseudotime.

If Applicants' method determines in step 450 that the user does not request deferred stubbing for the logical volume, then Applicants' method transitions from step 450 to step 460 wherein Applicants' method determines if the user requests the logical volume be kept until the next access. In certain embodiments, the user of step 450 comprises a host computer. In certain embodiments, the request of step 450 is provided using an operator input station, such as operator input station 150 (FIG. 1). If Applicants' method determines in step 450 the user requests the logical volume be kept until the next access, then Applicants' method transitions from step 460 to step 465 wherein Applicants' method assigns a sixth pseudotime to the logical volume, where that sixth pseudotime is later than the fifth pseudotime time, and where the keep until access range includes that sixth pseudotime.

If Applicants' method determines in step 460 that the user does not request the logical volume be kept until next access, then Applicants' method transitions from step 460 to step 470 wherein Applicants' method determines if the user requests the logical volume be kept until expiration. In certain embodiments, the user of step 470 comprises a host computer. In certain embodiments, the request of step 470 is provided using an operator input station, such as operator input station 150 (FIG. 1). If Applicants' method determines in step 470 that the user requests the logical volume be kept until expiration, then Applicants' method transitions from step 470 to step 475 wherein Applicants' method assigns a seventh pseudotime to the logical volume, where that seventh pseudotime is later than the sixth pseudotime time, and where the keep until expire range includes that seventh pseudotime.

If Applicants' method determines in step 480 that the user does not request the logical volume be kept until expiration, then Applicants' method transitions from step 470 to step 480 wherein Applicants' method determines if the logical volume was accessed in the DASD with an assigned pseudotime in the keep until access range. If Applicants' method determines in step 480 that the logical volume was accessed in the DASD with an assigned pseudotime in the keep until access range, then Applicants' method transitions from step 480 to step 485 wherein Applicants' method assigns a fourth pseudotime to the logical volume, where that fourth pseudotime is earlier than the current time.

If Applicants' method determines in step 480 that the logical volume was not accessed in the DASD with an assigned pseudotime in the keep until access range, then Applicants' method transitions from step 480 to step 490 wherein Applicants' method assigns the current time as the logical volume's pseudotime.

Figure 5:
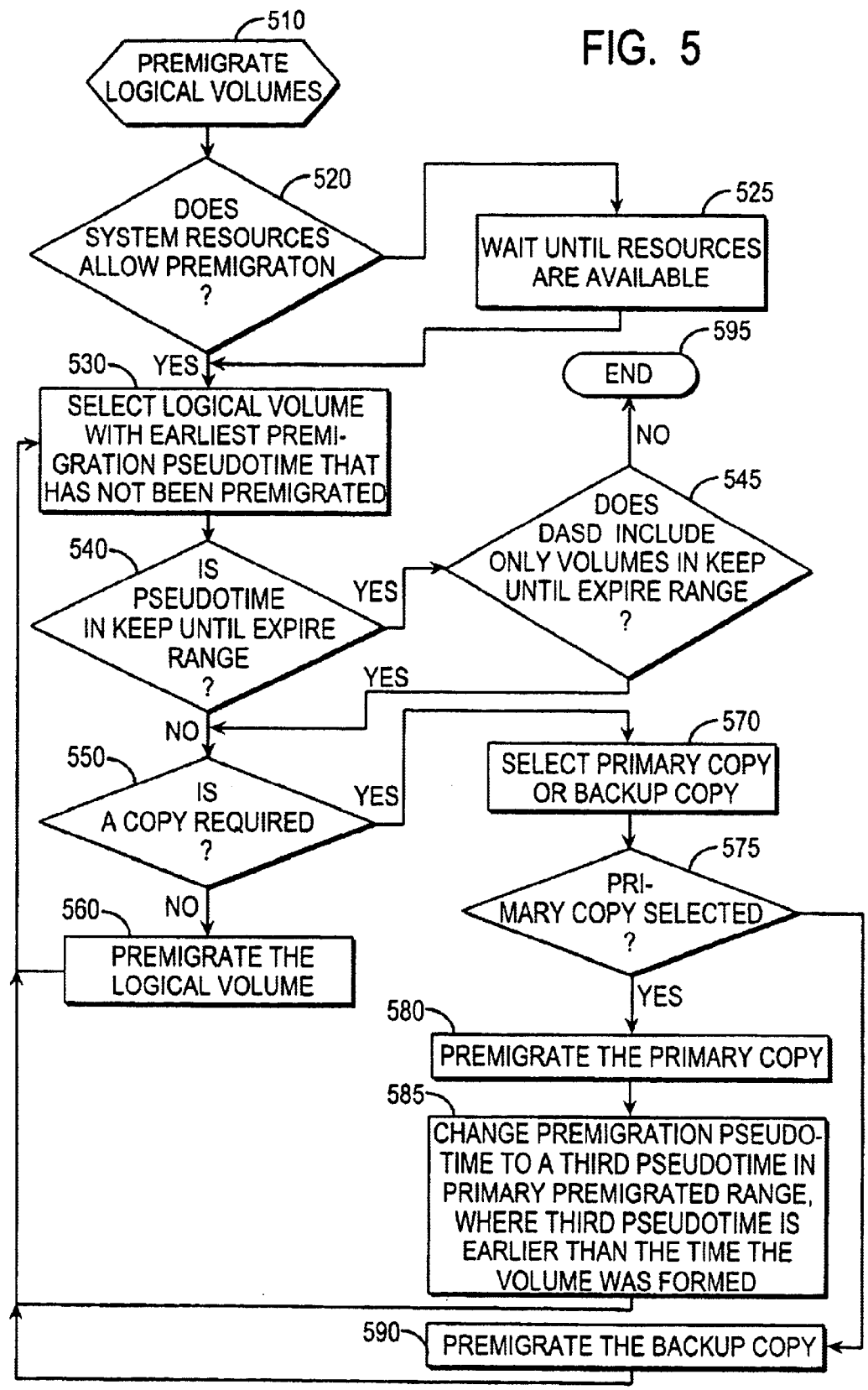
FIG. 5 is a flow chart summarizing the initial steps in a second embodiment of Applicants' method.

Prior to stubbing, logical volumes from a first information storage medium, those logical volumes must first be written to one or more second information storage media, i.e. premigrated. In certain embodiments, those one or more second information storage media include one or more magnetic information storage media, one or more optical information storage media, one or more electronic storage media, and combinations thereof. FIG. 5 summarizes the steps of Applicants' method to premigrate one or more logical volumes, where those one or more logical volumes are assigned a premigration pseudotime attribute.

Referring now to FIG. 5, Applicants' method begins at step 510 wherein one or more logical volumes are maintained in a first information storage medium. In step 520, Applicants' method determines if system resources allow premigration. In certain embodiments, such a determination includes, for example, whether one or more data storage devices are available, whether one or more physical volumes are available, and the like. If Applicants' method determines in step 520 that sufficient system resources are not available to premigrate one or more logical volumes, then Applicants' method transitions from step 520 to step 525 wherein Applicants' method monitors the availability of system resources. When sufficient system resources become available, then Applicants' method transitions from step 525 to step 530.

Alternatively, if Applicants' method determines in step 520 that sufficient system resources are available, then Applicants' method transitions from step 520 to step 530 wherein Applicants' method selects the logical volume having the earliest premigration pseudotime attribute, if that logical volume has not already been premigrated. Applicants' method transitions from step 530 to step 540 wherein Applicants' method determines if the logical volume's premigration pseudotime is in the keep until expire range. If Applicants' method determines in step 540 that the logical volume's premigration pseudotime is in the keep until expire range, then Applicants' method transitions from step 540 to step 550.

If Applicants' method determines in step 540 that the logical volume's premigration pseudotime is in the keep until expire range, then Applicants' method transitions from step 540 to step 545 wherein Applicants' method determines if only logical volumes having pseudotimes in the keep until expire range are being maintained in the first information storage medium, i.e. the DASD. If Applicants' method determines in step 545 that only logical volumes having pseudotimes in the keep until expire range are being maintained in the first information storage medium, then Applicants' method transitions from step 545 to step 550. Alternatively, if Applicants' method determines in step 545 logical volumes having premigration pseudotimes in ranges other than the keep until expire range are being maintained in the first information storage medium, then Applicants' method transitions from step 545 to step 595 and ends.

In step 550, Applicants' method determines if a copy of the logical volume is required. If Applicants' method determines in step 550 that a copy of the logical volume is not required, then Applicants' method transitions from step 550 to step 560 wherein Applicants' method premigrates the logical volume. Applicants' method transitions from step 560 to step 530 and continues.

If Applicants' method determines in step 550 that a copy is required, then Applicants' method transitions from step 550 to step 570 wherein Applicants' method selects either a first copy, i.e. the primary copy, or a second copy, i.e. the backup copy, of the logical volume. In certain embodiments, the selection of step 570 is based on, for example, what one or more second information storage media are presently mounted. In certain embodiments, the selection of step 570 is performed by the virtual tape system. In certain embodiments, the selection of step 570 is performed by a host computer. In certain embodiments, the selection of step 570 is made by a user.

Applicants' method transitions from step 570 to step 575 wherein Applicants' method determines if the primary copy was selected. If Applicants' method determines in step 575 that the primary copy was selected, then Applicants' method transitions from step 575 to step 580 wherein Applicants' method premigrates that primary copy. Applicants' method transitions from step 580 to step 585 wherein Applicants' method changes the logical volume's premigration pseudotime to a third pseudotime, where the primary premigrated range includes that third pseudotime, and where that third pseudotime is earlier than the time the logical volume was formed. Applicants' method transitions from step 585 to step 530 and continues.

If Applicants' method determines in step 575 that the primary copy was not selected, then Applicants' method transitions from step 575 to step 585 wherein Applicants' method premigrates the backup copy of the logical volume. Applicants' method transitions from step 590 to step 530 and continues.

Figure 6:
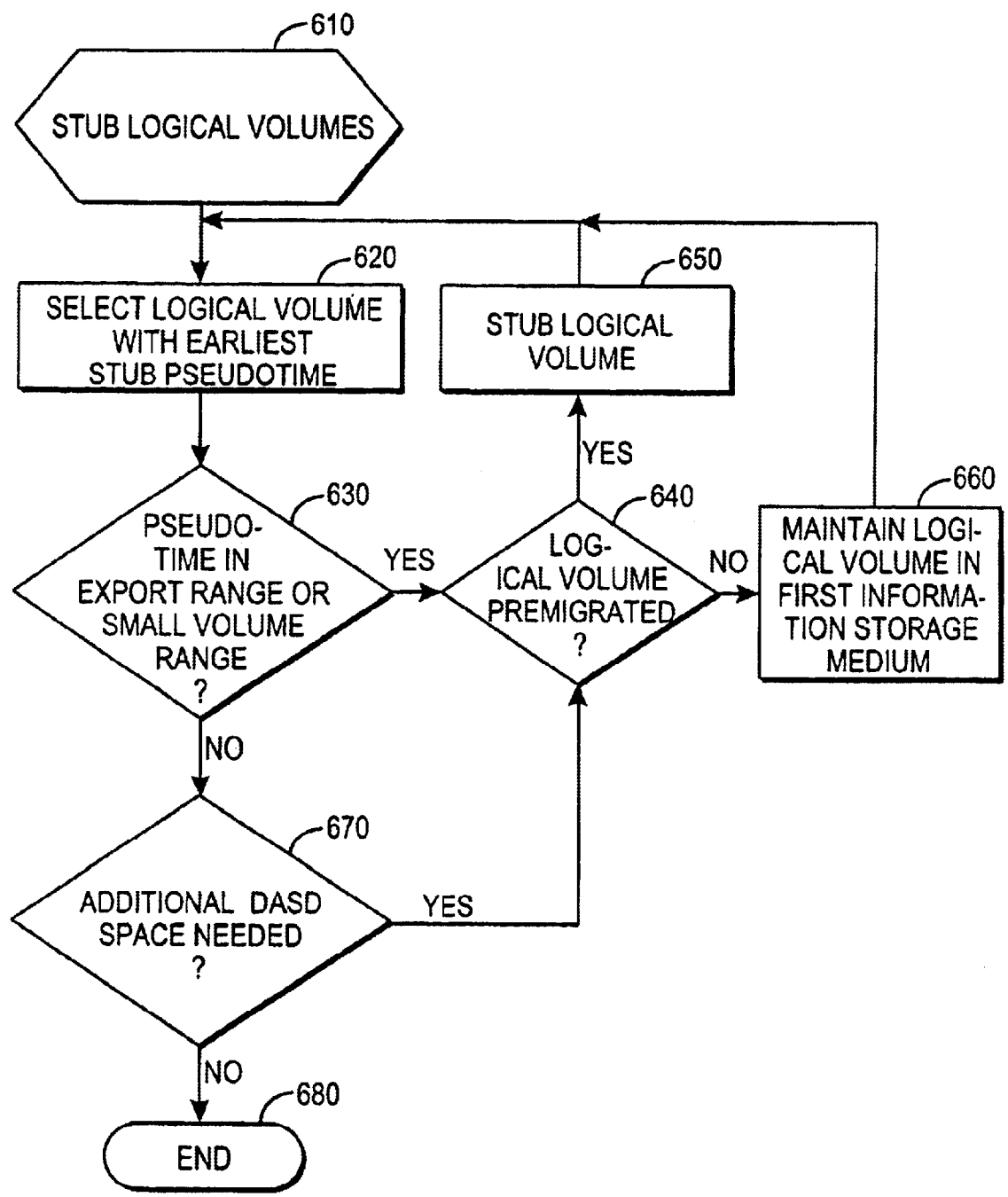
FIG. 6 is a flow chart summarizing additional steps in the second embodiment of FIG. 5A.

Logical volumes that have been premigrated can be stubbed from the first information storage medium. FIG. 6 summarizes the steps of Applicants' method to stub one or more logical volumes from an information storage medium. Referring now to FIG. 6, Applicants' method begins at step 610 wherein one or more logical volumes that have been premigrated are maintained in the information storage medium. In step 620, Applicants' method selects the logical volume with the earliest pseudotime. In step 630, Applicants' method determines if the logical volume's stubbing pseudotime attribute is in either the export range or the small volume range.

If Applicants' method determines in step 630 that the logical volume's stubbing pseudotime attribute is in either the export range or the small volume range, then Applicants' method transitions from step 630 to step 640 wherein Applicants' method determines if the logical volume has been premigrated. If Applicants' method determines in step 640 that the logical volume has been premigrated, then Applicants' method transitions from step 640 to step 650 wherein the logical volume is stubbed. Alternatively, if Applicants' method determines in step 640 that the logical volume has not been premigrated, then Applicants' method transitions from step 640 to step 660 wherein Applicants' method maintains the logical volume in the first information storage medium. Applicants' method transitions from step 660 to step 620 and continues.

If Applicants' method determines in step 630 that the logical volume's stubbing pseudotime attribute is not in either the export range or the small volume range, then Applicants' method transitions from step 630 to step 670 wherein Applicants' method determines if additional logical volumes are to be removed from the information storage medium. In certain embodiments, step 670 includes determining if additional DASD space is needed. In certain embodiments, the determination of step 670 is performed by a virtual tape system. In certain embodiments, the determination of step 670 is performed by a host computer. In certain embodiments, the determination of step 670 is performed by a user.

If Applicants' method determines in step 670 to remove additional logical volumes from the information storage medium, then Applicants' method transitions from step 670 to step 640 and continues. Alternatively, if Applicants' method determines in step 670 not to remove additional logical volumes from the information storage medium, then Applicants' method transitions from step 670 to step 680 and ends.

The embodiments of Applicants' method recited in FIGS. 4, 5, and 6 may implemented separately. For example, one embodiment may include only the steps of FIG. 4. Another embodiment may utilize the steps of FIG. 5. Other embodiments, may include only the steps of FIG. 6. Moreover, in certain embodiments, the individual steps recited in FIGS. 4, 5, and 6, may be combined, eliminated, or reordered.

Applicants' invention includes an article of manufacture comprising a computer useable medium having computer readable program code disposed therein to assign a premigration pseudotime attribute and a stubbing pseudotime attribute to a logical volume. Applicants' invention includes an article of manufacture comprising a computer useable medium having computer readable program code disposed therein to premigrate one or more logical volumes based upon the premigration pseudotime attributes assigned to those one or more logical volumes. Applicants' invention includes an article of manufacture comprising a computer useable medium having computer readable program code disposed therein to stub from a first information storage medium one or more logical volumes based upon the stubbing pseudotime attributes assigned to those one or more logical volumes.

Applicants' invention further includes computer program products embodied as program code stored in one or more memory devices, such as a magnetic disk, a magnetic tape, or other non-volatile memory device, to assign pseudotime attributes to a logical volume. Applicants' invention further includes computer program products embodied as program code stored in one or more memory devices, such as a magnetic disk, a magnetic tape, or other non-volatile memory device, to premigrate one or more logical volumes based upon the premigration pseudotime attributes assigned to those one or more logical volumes. Applicants' invention further includes computer program products embodied as program code stored in one or more memory devices, such as a magnetic disk, a magnetic tape, or other non-volatile memory device, to stub from a first information storage medium one or more logical volumes based upon the stubbing pseudotime attributes assigned to those one or more logical volumes.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to assign a premigration pseudotime attribute and a stubbing pseudotime attribute to a logical volume, comprising the steps of:

maintaining a logical volume in a first information storage medium at a first time;

defining a plurality of host requests;

defining a plurality of pseudotime ranges, where each of said pseudotime ranges is associated with a different one of said host requests;

determining if a user provides a host request for said logical volume;

operative if said user provides a host request for said logical volume, assigning to said logical volume a premigration pseudotime attribute, and a stubbing pseudotime attribute, comprising a time within the pseudotime range associated with that host request;

operative if said user does not provide a host request for said logical volume, assigning to said logical volume said first time as said premigration pseudotime attribute, and said first time as said stubbing pseudotime attribute; and saving said premigration pseudotime attribute and said stubbing pseudotime attribute.

2. The method of claim 1, further comprising the steps of:

determining if said user requests said logical volume be exported;

operative if said user requests said logical volume be exported, assigning a first pseudotime as said premigration pseudotime attribute and as said stubbing pseudotime attribute, wherein said first pseudotime is earlier than said first time.

3. The method of claim 1, further comprising the steps of:

determining if said logical volume is smaller than about 4 kilobytes;

operative if said logical volume is smaller than about 4 kilobytes, assigning a second pseudotime as said premigration pseudotime attribute and as said stubbing pseudotime attribute, wherein said second pseudotime is earlier than said first time, and wherein said second pseudotime is later than said first pseudotime.

4. The method of claim 1, further comprising the steps of:

determining if said user requests said logical volume be purged;

operative if said user requests said logical volume be purged, assigning a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime.

5. The method of claim 1, further comprising the steps of:

determining if said user requests deferring stubbing for said logical volume;

operative if said user requests deferring stubbing for said logical volume, assigning a fifth pseudotime as said premigration pseudotime attribute and as said stubbing pseudotime attribute, wherein said fifth pseudotime is later than said first time.

6. The method of claim 1, further comprising the steps of:

determining if said user requests said logical volume be kept in the information storage medium until next access;

operative if said user requests said logical volume be kept in the information storage medium until next access, assigning a sixth pseudotime as said premigration pseudotime attribute and as said stubbing pseudotime attribute, wherein said sixth pseudotime is later than said first time and later than said fifth pseudotime.

7. The method of claim 1, further comprising the steps of:

determining if said user requests said logical volume be maintained in said information storage medium until expiration;

operative if said user requests said logical volume be maintained in said information storage medium until expiration, assigning a seventh pseudotime as said premigration pseudotime attribute and as said stubbing pseudotime attribute, wherein said seventh pseudotime is later than said first time, said fifth pseudotime, and said sixth pseudotime.

8. The method of claim 1, further comprising the steps of:

determining if the logical volume was accessed in the first information storage medium with a premigration pseudotime in the keep until access range;

operative if the logical volume was accessed in the first information storage medium with a premigration pseudotime in the keep until access range, assigning a fourth pseudotime as said premigration pseudotime attribute and as said stubbing pseudotime attribute, wherein said fourth pseudotime is earlier than said first time.

9. The method of claim 1, wherein:

said plurality of pseudotime ranges comprises an export range, a small volume range, a host purge range, a primary premigration range, a deferred range, a keep until access range, and a keep until expire range; and said export range includes said first pseudotime, said small volume range includes said second pseudotime, said host purge range includes said fourth pseudotime, said deferred range includes said fifth pseudotime, said keep until access range includes said sixth pseudotime, and said keep until expire range includes said seventh pseudotime.

10. A method to assign pseudotime attributes to one or more logical volumes disposed in an information storage medium, comprising the steps of:

maintaining a logical volume in an information storage medium at a first time, wherein said logical volume comprises a premigration pseudotime attribute and a stubbing pseudotime attribute;

determining if said user requests said logical volume be exported;

operative if said user requests said logical volume be exported, assigning a first pseudotime as said premigration pseudotime attribute and as said stubbing pseudotime attribute, wherein said first pseudotime is earlier than said first time;

determining if said logical volume is smaller than about 4 kilobytes;

operative if said logical volume is smaller than about 4 kilobytes, assigning a second pseudotime as said premigration pseudotime attribute and as said stubbing pseudotime attribute, wherein said second pseudotime is earlier than said first time, and wherein said second pseudotime is later than said first pseudotime;

determining if said user requests said logical volume be purged from said information storage medium;

operative if said user requests said logical volume be purged from said information storage medium, assigning a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime;

determining if said user requests deferring stubbing for said logical volume;

operative if said user requests deferring stubbing for said logical volume, assigning a fifth pseudotime as said premigration pseudotime attribute and as said stubbing pseudotime attribute, wherein said fifth pseudotime is later than said first time;

determining if said user requests said logical volume be kept in the information storage medium until access;

operative if said user requests said logical volume be kept in said information storage medium until access, assigning a sixth pseudotime as said premigration pseudotime attribute and as said stubbing pseudotime attribute, wherein said sixth pseudotime is later than said first time and later than said fifth pseudotime; and determining if said user requests said logical volume be maintained in said information storage medium until expiration;

operative if said user requests said logical volume be maintained in said information storage medium until expiration, assigning a seventh pseudotime as said premigration pseudotime attribute and as said stubbing pseudotime attribute, wherein said seventh pseudotime is later than said first time, said fifth pseudotime, and said sixth pseudotime;

determining if the logical volume was accessed in the first information storage medium with a premigration pseudotime in the keep until access range;

operative if the logical volume was accessed in the first information storage medium with a premigration pseudotime in the keep until access range, assigning a fourth pseudotime as said premigration pseudotime attribute and as said stubbing pseudotime attribute, wherein said fourth pseudotime is earlier than the time the logical volume was formed;

operative if said logical volume was not accessed in the first information storage medium with a premigration pseudotime in the keep until access range, assigning said first time as said premigration pseudotime attribute and as said stubbing pseudotime attribute; and saving said logical volume and said assigned premigration pseudotime attribute and said stubbing pseudotime attribute.

11. A method to premigrate one or more logical volumes maintain in a first information storage medium, wherein each logical volume comprises a premigration pseudotime attribute, comprising the steps of:

providing a plurality of second information storage media;

selecting the logical volume having the earliest premigration pseudotime attribute;

writing said selected logical volume to one or more second information storage media;

defining a plurality of pseudotime ranges, including a keep until expire range;

determining if said logical volume comprises a premigration pseudotime attribute in said keep until expire range;

operative if said logical volume comprises a premigration pseudotime attribute in said keep until expire range, determining if said first information storage medium includes only logical volumes having premigration pseudotime attributes in said keep until expire range;

operative if said first information storage medium includes only logical volumes having premigration pseudotime attributes in said keep until expire range, determining if a copy of said logical volume is required.

12. The method of claim 11, further comprising the steps of:

operative if a copy of said logical volume is required, selecting a primary copy or a backup copy of said logical volume;

determining if said primary copy was selected;

operative if said primary copy was selected:

writing said primary copy to one or more second information storage media; and changing said premigration pseudotime attribute to a pseudotime earlier than the time said logical volume was formed.

13. The method of claim 12, further comprising the step of operative if said backup copy was selected, writing said backup copy to one or more second information storage media.

14. A method to premigrate one or more logical volumes maintained in a first information storage medium, wherein each logical volume comprises a premigration pseudotime attribute, comprising the steps of:

providing a plurality of second information storage media;

defining a plurality of pseudotime ranges, including a keep until expire range;

selecting the logical volume having the earliest premigration pseudotime attribute; and determining if said logical volume comprises a premigration pseudotime attribute in said keep until expire range;

operative if said logical volume comprises a premigration pseudotime attribute in said keep until expire range, determining if said first information storage medium includes only logical volumes having premigration pseudotime attributes in said keep until expire range;

operative if said first information storage medium includes only logical volumes having premigration pseudotime attributes in said keep until expire range, determining if a copy of said logical volume is required;

operative if a copy of said logical volume is required, selecting a primary copy or a backup copy of said logical volume;

determining if said primary copy was selected;

operative if said primary copy was selected:

writing said primary copy to one or more second information storage media; and changing said premigration pseudotime attribute to a pseudotime earlier than the time said logical volume was formed;

operative if said backup copy was selected, writing said backup copy to one or more second information storage media;

operative if a copy of said logical volume is not required, writing said logical volume to one or more second information storage media.

15. A method to remove from a first information storage medium one or more logical volumes comprising a stubbing pseudotime attribute, comprising the steps of:

maintaining a plurality of logical volumes in a first information storage medium, wherein each of said plurality of logical volumes comprises a stubbing pseudotime attribute;

selecting the logical volume with the earliest stubbing pseudotime attribute, wherein said selected logical volume comprises information;

removing said selected logical volume from said first information storage medium;

determining if one or more second information storage media comprises said information; and operative if one or more second information storage media comprises said information, setting one or more pointers in said first information indicating said one or more second information storage media comprising said information.

16. The method of claim 15, further comprising the step of:

operative if one or more second information storage media do not comprise said information, maintaining said logical volume in said first information storage medium.

17. The method of claim 16, further comprising the steps of:
- determining if said export range or said small volume range includes said stubbing pseudotime attribute;
- operative if neither said export range nor said small volume range includes said stubbing pseudotime attribute, determining if additional first information storage medium storage capability is needed;
- operative if additional first information storage medium storage capability is needed, removing said logical volume from said first information storage medium.

18. A method to remove a logical volume from an information storage medium, wherein said logical volume comprises information, comprising the steps of:
- defining a first range of pseudotimes comprising an export range;
- defining a second range of pseudotimes comprising a small volume range;
- maintaining a plurality of logical volumes in a first information storage medium, wherein each of said plurality of logical volumes comprises a stubbing pseudotime attribute;
- selecting the logical volume with the earliest stubbing pseudotime attribute;
- determining if one or more second information storage media comprises said information;
- operative if one or more second information storage media comprises said information, setting one or more pointers in said first information indicating said one or more second information storage media comprising said information
- determining if said export range or said small volume range includes said stubbing pseudotime attribute;
- operative if neither said export range nor said small volume range includes said stubbing pseudotime attribute, determining if additional first information storage medium storage capability is needed;
- operative if additional first information storage medium storage capability is needed, removing said logical volume from said first information storage medium;
- removing said selected logical volume from said first information storage medium.

19. An article of manufacture comprising a computer useable medium having computer readable program code disposed therein to assign a premigration pseudotime attribute and a stubbing pseudotime attribute to a logical volume, the computer readable program code comprising a series of computer readable program steps to effect:
- maintaining a logical volume in a first information storage medium at a first time;
- defining a plurality of host requests;
- defining a plurality of pseudotime ranges, where each of said pseudotime ranges is associated with a different one of said host requests;
- determining if a user provides a host request for said logical volume;
- operative if said user provides a host request for said logical volume, assigning to said logical volume a premigration pseudotime attribute, and a stubbing pseudotime attribute, comprising a time within the pseudotime range associated with that host request;
- operative if said user does not provide a host request for said logical volume, assigning to said logical volume said first time as said premigration pseudotime attribute, and said first time as said stubbing pseudotime attribute; and
- saving said premigration pseudotime attribute and said stubbing pseudotime attribute.

20. The article of manufacture of claim 19, wherein said computer readable program code further comprises a series of computer readable program steps to effect:
- determining if said user requests said logical volume be exported;
- operative if said user requests said logical volume be exported, assigning a first pseudotime as said premigration pseudotime attribute and as said stubbing pseudotime attribute, wherein said first pseudotime is earlier than said first time.

21. The article of manufacture of claim 19, wherein said computer readable program code further comprises a series of computer readable program steps to effect:
- determining if said logical volume is smaller than about 4 kilobytes;
- operative if said logical volume is smaller than about 4 kilobytes, assigning a second pseudotime as said premigration pseudotime attribute and as said stubbing pseudotime attribute, wherein said second pseudotime is earlier than said first time, and wherein said second pseudotime is later than said first pseudotime.

22. The article of manufacture of claim 19, wherein said computer readable program code further comprises a series of computer readable program steps to effect:
- determining if said user requests said logical volume be purged;
- operative if said user requests said logical volume be purged, assigning a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime.

23. The article of manufacture of claim 19, wherein said computer readable program code further comprises a series of computer readable program steps to effect:
- determining if said user requests deferring stubbing for said logical volume;
- operative if said user requests deferring stubbing for said logical volume, assigning a fifth pseudotime as said premigration pseudotime attribute and as said stubbing pseudotime attribute, wherein said fifth pseudotime is later than said first time.

24. The article of manufacture of claim 19, wherein said computer readable program code further comprises a series of computer readable program steps to effect:
- determining if said user requests said logical volume be kept in the information storage medium until next access;
- operative if said user requests said logical volume be kept in the information storage medium until next access, assigning a sixth pseudotime as said premigration pseudotime attribute and as said stubbing pseudotime attribute, wherein said sixth pseudotime is later than said first time and later than said fifth pseudotime.

25. The article of manufacture of claim 19, wherein said computer readable program code further comprises a series of computer readable program steps to effect:
- determining if said user requests said logical volume be kept in said information storage medium until expiration;

operative if said user requests said logical volume be kept in said information storage medium until expiration, assigning a seventh pseudotime as said premigration pseudotime attribute and as said stubbing pseudotime attribute, wherein said seventh pseudotime is later than said first time, said fifth pseudotime, and said sixth pseudotime.

26. The article of manufacture of claim 19, wherein said computer readable program code further comprises a series of computer readable program steps to effect:

determining if the logical volume was accessed in the first information storage medium with a premigration pseudotime in the keep until access range;

operative if the logical volume was accessed in the first information storage medium with a premigration pseudotime in the keep until access range, assigning a fourth pseudotime as said premigration pseudotime attribute and as said stubbing pseudotime attribute, wherein said fourth pseudotime is earlier than said first time.

27. The article of manufacture of claim 19, wherein said computer readable program code further comprises a series of computer readable program steps to effect:

defining a plurality of pseudotime ranges, wherein said plurality of pseudotime ranges comprises an export range, a small volume range, a host purge range, a primary premigration range, a deferred range, a keep until access range, and a keep until expire range;

wherein said export range includes said first pseudotime, said small volume range includes said second pseudotime, said host purge range includes said fourth pseudotime, said deferred range includes said fifth pseudotime, said keep until access range includes said sixth pseudotime, and said keep until expire range includes said seventh pseudotime.

28. An article of manufacture comprising a computer useable medium having computer readable program code disposed therein to assign pseudotime attributes to one or more logical volumes disposed in an information storage medium, the computer readable program code comprising a series of computer readable program steps to effect:

maintaining a logical volume in an information storage medium at a first time, wherein said logical volume comprises a premigration pseudotime attribute and a stubbing pseudotime attribute;

determining if said user requests said logical volume be exported;

operative if said user requests said logical volume be exported, assigning a first pseudotime as said premigration pseudotime attribute and as said stubbing pseudotime attribute, wherein said first pseudotime is earlier than said first time;

determining if said logical volume is smaller than about 4 kilobytes;

operative if said logical volume is smaller than about 4 kilobytes, assigning a second pseudotime as said premigration pseudotime attribute and as said stubbing pseudotime attribute, wherein said second pseudotime is earlier than said first time, and wherein said second pseudotime is later than said first pseudotime;

determining if said user requests said logical volume be purged from said information storage medium;

operative if said user requests said logical volume be purged from said information storage medium, assigning a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime;

determining if said user requests deferring stubbing for said logical volume;

operative if said user requests deferring stubbing for said logical volume, assigning a fifth pseudotime as said premigration pseudotime attribute and as said stubbing pseudotime attribute, wherein said fifth pseudotime is later than said first time;

determining if said user requests said logical volume be kept in the information storage medium until access;

operative if said user requests said logical volume be kept in said information storage medium until access, assigning a sixth pseudotime as said premigration pseudotime attribute and as said stubbing pseudotime attribute, wherein said sixth pseudotime is later than said first time and later than said fifth pseudotime; and determining if said user requests said logical volume be maintained in said information storage medium until expiration;

operative if said user requests said logical volume be maintained in said information storage medium until expiration, assigning a seventh pseudotime as said premigration pseudotime attribute and as said stubbing pseudotime attribute, wherein said seventh pseudotime is later than said first time, said fifth pseudotime, and said sixth pseudotime;

determining if the logical volume was accessed in the first information storage medium with a premigration pseudotime in the keep until access range;

operative if the logical volume was accessed in the first information storage medium with a premigration pseudotime in the keep until access range, assigning a fourth pseudotime as said premigration pseudotime attribute and as said stubbing pseudotime attribute, wherein said fourth pseudotime is earlier than the time the logical volume was formed;

operative if said logical volume was not accessed in the first information storage medium with a premigration pseudotime in the keep until access range, assigning said first time as said premigration pseudotime attribute and as said stubbing pseudotime attribute; and saving said logical volume and said assigned premigration pseudotime attribute and said stubbing pseudotime attribute.

29. An article of manufacture comprising a computer useable medium having computer readable program code disposed therein to premigrate one or more logical volumes comprising a premigration pseudotime attribute, the computer readable program code comprising a series of computer readable program steps to effect:

maintaining in a first information storage medium a plurality of logical volumes comprising a premigration pseudotime attribute;

providing a plurality of second information storage media;

selecting the logical volume having the earliest premigration pseudotime attribute; and writing said selected logical volume to one or more second information storage media;

defining a plurality of pseudotime ranges, including a keep until expire range;

determining if said logical volume comprises a premigration pseudotime attribute in said keep until expire range;

operative if said logical volume comprises a premigration pseudotime attribute in said keep until expire range, determining if said first information storage medium includes only logical volumes having premigration pseudotime attributes in said keep until expire range;

operative if said first information storage medium includes only logical volumes having premigration pseudotime attributes in said keep until expire range, determining if a copy of said logical volume is required.

30. The article of manufacture of claim 29, wherein said computer readable program code further comprises a series of computer readable program steps to effect:

operative if a copy of said logical volume is required, selecting a primary copy or a backup copy of said logical volume;

determining if said primary copy was selected;

operative if said primary copy was selected;

writing said primary copy to one or more second information storage media; and changing said premigration pseudotime attribute to a pseudotime earlier than the time said logical volume was formed.

31. The article of manufacture of claim 30, wherein said computer readable program code further comprises a series of computer readable program steps to, if said backup copy was selected, effect writing said backup copy to one or more second information storage media.

32. An article of manufacture comprising a computer useable medium having computer readable program code disposed therein to premigrate one or more logical volumes comprising a premigration pseudotime attribute, the computer readable program code comprising a series of computer readable program steps to effect:

providing a plurality of second information storage media;

defining a plurality of pseudotime ranges, including a keep until expire range;

selecting the logical volume having the earliest premigration pseudotime attribute; and determining if said logical volume comprises a premigration pseudotime attribute in said keep until expire range;

operative if said logical volume comprises a premigration pseudotime attribute in said keep until expire range, determining if said first information storage medium includes only logical volumes having premigration pseudotime attributes in said keep until expire range;

operative if said first information storage medium includes only logical volumes having premigration pseudotime attributes in said keep until expire range, determining if a copy of said logical volume is required;

operative if a copy of said logical volume is required, selecting a primary copy or a backup copy of said logical volume;

determining if said primary copy was selected;

operative if said primary copy was selected:

writing said primary copy to one or more second information storage media; and changing said premigration pseudotime attribute to a pseudotime earlier than the time said logical volume was formed;

operative if said backup copy was selected, writing said backup copy to one or more second information storage media;

operative if a copy of said logical volume is not required, writing said logical volume to one or more second information storage media.

33. An article of manufacture comprising a computer useable medium having computer readable program code disposed therein to remove from a first information storage medium one or more logical volumes comprising a stubbing pseudotime attribute, the computer readable program code comprising a series of computer readable program steps to effect:

maintaining a plurality of logical volumes in a first information storage medium, wherein each of said plurality of logical volumes comprise a stubbing pseudotime attribute;

selecting the logical volume with the earliest stubbing pseudotime attribute;

removing said selected logical volume from said first information storage medium;

determining if said logical volume was written to one or more second information storage media; and operative if said logical volume was written to one or more second information storage media, setting one or more pointers in said first information indicating said one or more second information storage media.

34. The article of manufacture of claim 33, wherein said computer readable program code further comprises a series of computer readable program steps to effect:

operative if said logical volume was not written to one or more second information storage media, maintaining said logical volume in said first information storage medium.

35. The article of manufacture of claim 34, wherein said computer readable program code further comprises a series of computer readable program steps to effect:

defining a first range of pseudotimes comprising an export range;

defining a second range of pseudotimes comprising a small volume range;

determining if said export range or said small volume range includes said stubbing pseudotime attribute;

operative if neither said export range nor said small volume range includes said stubbing pseudotime attribute, determining if additional first information storage medium storage capability is needed.

36. An article of manufacture comprising a computer useable medium having computer readable program code disposed therein to remove from a first information storage medium one or more logical volumes comprising a stubbing pseudotime attribute, the computer readable program code comprising a series of computer readable program steps to effect:

maintaining a plurality of logical volumes in a first information storage medium, wherein each of said plurality of logical volumes comprises a stubbing pseudotime attribute;

selecting the logical volume with the earliest stubbing pseudotime attribute;

determining if said logical volume is premigrated;

operative if said logical volume is premigrated, determining the one or more second information storage media comprising said information;

saving one or more pointers in said first information indicating said one or more second information storage media; and removing said selected logical volume from said first information storage medium.

37. A computer program product usable with a programmable computer processor having computer readable program code embodied therein to assign a premigration pseudotime attribute and a stubbing pseudotime attribute to a logical volume, comprising:

computer readable program code which causes said programmable computer processor to maintain a logical volume in a first information storage medium at a first time;

computer readable program code which causes said programmable computer processor to define a plurality of host requests;

computer readable program code which causes said programmable computer processor to define a plurality of pseudotime ranges, where each of said pseudotime ranges is associated with a different one of said host requests;

computer readable program code which causes said programmable computer processor to determine if a user provides a host request for said logical volume;

computer readable program code which, if said user provides a host request for said logical volume, causes said programmable computer processor to assign to said logical volume a premigration pseudotime attribute, and a stubbing pseudotime attribute, comprising a time within the pseudotime range associated with that host request;

computer readable program code which, if said user does not provide a host request for said logical volume, causes said programmable computer processor to assign to said logical volume said first time as said premigration pseudotime attribute, and said first time as said stubbing pseudotime attribute; and computer readable program code which causes said programmable computer processor to save said premigration pseudotime attribute and said stubbing pseudotime attribute.

38. The computer program product of claim 37, further comprising:

computer readable program code which causes said programmable computer processor to determine if said user requests said logical volume be exported;

computer readable program code which, if said user requests said logical volume be exported, causes said programmable computer processor to assign a first pseudotime as said premigration pseudotime attribute and as said stubbing pseudotime attribute, wherein said first pseudotime is earlier than said first time.

39. The computer program product of claim 37, further comprising:

computer readable program code which causes said programmable computer processor to determine if said logical volume is smaller than about 4 kilobytes;

computer readable program code which, if said logical volume is smaller than about 4 kilobytes, causes said programmable computer processor to assign a second pseudotime as said premigration pseudotime attribute and as said stubbing pseudotime attribute, wherein said second pseudotime is earlier than said first time, and wherein said second pseudotime is later than said first pseudotime.

40. The computer program product of claim 37, further comprising:

computer readable program code which causes said programmable computer processor to determine if said user requests said logical volume be purged;

computer readable program code which, if said user requests said logical volume be purged, causes said programmable computer processor to assign a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime.

41. The computer program product of claim 37, further comprising:

computer readable program code which causes said programmable computer processor to determine if said user requests deferring stubbing for said logical volume;

computer readable program code which, if said user requests deferring stubbing for said logical volume, causes said programmable computer processor to assign a fifth pseudotime as said premigration pseudotime attribute and as said stubbing pseudotime attribute, wherein said fifth pseudotime is later than said first time.

42. The computer program product of claim 37, further comprising:

computer readable program code which causes said programmable computer processor to determine if said user requests said logical volume be kept in the information storage medium until the next access;

computer readable program code which, if said user requests said logical volume be kept in said information storage medium until the next access, causes said programmable computer processor to assign a sixth pseudotime as said premigration pseudotime attribute and as said stubbing pseudotime attribute, wherein said sixth pseudotime is later than said first time and later than said fifth pseudotime.

43. The computer program product of claim 37, further comprising:

computer readable program code which causes said programmable computer processor to determine if said user requests said logical volume be kept in said information storage medium until expiration;

computer readable program code which, if said user requests said logical volume be kept in said information storage medium until expiration, causes said programmable computer processor to assign a seventh pseudotime as said premigration pseudotime attribute and as said stubbing pseudotime attribute, wherein said seventh pseudotime is later than said first time, said fifth pseudotime, and said sixth pseudotime.

44. The computer program product of claim 37, further comprising:

computer readable program code which causes said programmable computer processor to determine if the logical volume was accessed in the first information storage medium with a premigration pseudotime in the keep until access range;

computer readable program code which, if the logical volume was accessed in the first information storage medium with a premigration pseudotime in the keep until access range, causes said programmable computer processor to assign a fourth pseudotime as said premigration pseudotime attribute and as said stubbing pseudotime attribute, wherein said fourth pseudotime is earlier than said first time.

45. The computer program product of claim 37, further comprising:

computer readable program code which causes said programmable computer processor to define a plurality of pseudotime ranges, wherein said plurality of pseudotime ranges comprises an export range, a small volume range, a host purge range, a primary premigration range, a deferred range, a keep until access range, and a keep until expire range;

wherein said export range includes said first pseudotime, said small volume range includes said second pseudotime, said host purge range includes said fourth pseudotime, said deferred range includes said fifth pseudotime, said keep until access range includes said sixth pseudotime, and said keep until expire range includes said seventh pseudotime.

46. A computer program product usable with a programmable computer processor having computer readable program code embodied therein to assign pseudotime attributes to one or more logical volumes disposed in an information storage medium, comprising:

computer readable program code which causes said programmable computer processor to maintain a logical volume in an information storage medium at a first time, wherein said logical volume comprises a premigration pseudotime attribute and a stubbing pseudotime attribute;

computer readable program code which causes said programmable computer processor to determine if a user requests said logical volume be exported;

computer readable program code which, if said user requests said logical volume be exported, causes said programmable computer processor to assign a first pseudotime as said premigration pseudotime attribute and as said stubbing pseudotime attribute, wherein said first pseudotime is earlier than said first time;

computer readable program code which causes said programmable computer processor to determine if said logical volume is smaller than about 4 kilobytes;

computer readable program code which, if said logical volume is smaller than about 4 kilobytes, causes said programmable computer processor assign a second pseudotime as said premigration pseudotime attribute and as said stubbing pseudotime attribute, wherein said second pseudotime is earlier than said first time, and wherein said second pseudotime is later than said first pseudotime;

computer readable program code which causes said programmable computer processor to determine if said user requests said logical volume be purged from said information storage medium;

computer readable program code which, if said user requests said logical volume be purged from said information storage medium, causes said programmable computer processor to assign a fourth pseudotime as said premigration pseudotime attribute and as said stubbing pseudotime attribute, wherein said fourth pseudotime is earlier than said first time, and wherein said fourth pseudotime is later than said first pseudotime, said second pseudotime, and said third pseudotime;

computer readable program code which causes said programmable computer processor to determine if said user requests deferring stubbing for said logical volume;

computer readable program code which, if said user requests deferring stubbing for said logical volume, causes said programmable computer processor to assigning a fifth pseudotime as said premigration pseudotime attribute and as said stubbing pseudotime attribute, wherein said fifth pseudotime is later than said first time;

computer readable program code which causes said programmable computer processor to determine if said user requests said logical volume be kept in the information storage medium until access;

computer readable program code which, if said user requests said logical volume be kept in said information storage medium until access, causes said programmable computer processor to assign a sixth pseudotime as said premigration pseudotime attribute and as said stubbing pseudotime attribute, wherein said sixth pseudotime is later than said first time and later than said fifth pseudotime; and computer readable program code which causes said programmable computer processor to determine if said user requests said logical volume be maintained in said information storage medium until expiration;

computer readable program code which, if said user requests said logical volume be maintained in said information storage medium until expiration, causes said programmable computer processor to assign a seventh pseudotime as said premigration pseudotime attribute and as said stubbing pseudotime attribute, wherein said seventh pseudotime is later than said first time, said fifth pseudotime, and said sixth pseudotime;

computer readable program code which causes said programmable computer processor to determine if the logical volume was accessed in the first information storage medium with a premigration pseudotime in the keep until access range;

computer readable program code which, if the logical volume was accessed in the first information storage medium with a premigration pseudotime in the keep until access range, causes said programmable computer processor to assign a fourth pseudotime as said premigration pseudotime attribute and as said stubbing pseudotime attribute, wherein said fourth pseudotime is earlier than the time the logical volume was formed;

computer readable program code which, if said logical volume was not accessed in the first information storage medium with a premigration pseudotime in the keep until access range, causes said programmable computer processor to assign said first time as said premigration pseudotime attribute and as said stubbing pseudotime attribute; and computer readable program code which causes said programmable computer processor to save said logical volume and said assigned premigration pseudotime attribute and said stubbing pseudotime attribute.

47. A computer program product usable with a programmable computer processor having computer readable program code embodied therein to premigrate one or more logical volumes comprising a premigration pseudotime attribute, comprising:

computer readable program code which causes said programmable computer processor to select the logical volume having the earliest premigration pseudotime attribute;

computer readable program code which causes said programmable computer processor to write said selected logical volume to one or more provided second information storage media;

computer readable program code which causes said programmable computer processor to define a plurality of pseudotime ranges, including a keep until range;

computer readable program code which causes said programmable computer processor to determine if said logical volume comprises a premigration pseudotime attribute in said keep until expire range;

computer readable program code which, if said logical volume comprises a premigration pseudotime attribute in said keep until expire range, causes said programmable computer processor to determine if said first information storage medium includes only logical volumes having premigration pseudotime attributes in said keep until expire range;

computer readable program code which, if said first information storage medium includes only logical volumes having premigration pseudotime attributes in said keep until expire range, causes said programmable computer processor to determine if a copy of said logical volume is required.

48. The computer program product of claim 47, further comprising:

computer readable program code which, if a copy of said logical volume is required causes said programmable computer processor to select a primary copy or a backup copy of said logical volume;

computer readable program code which causes said programmable computer processor to determine if said primary copy was selected;

computer readable program code which, if said primary copy was selected, causes said programmable computer processor to write said primary copy to one or more second information storage media, and to change said premigration pseudotime attribute to a pseudotime earlier than the time said logical volume was formed.

49. The computer program product of claim 48, further comprising:

computer readable program code which, if said backup copy was selected, causes said programmable computer processor to write said backup copy to one or more second information storage media.

50. A computer program product usable with a programmable computer processor having computer readable program code embodied therein to premigrate one or more logical volumes comprising a premigration pseudotime attribute, comprising:

computer readable program code which causes said programmable computer processor to define a plurality of pseudotime ranges, including a keep until expire range;

computer readable program code which causes said programmable computer processor to select the logical volume having the earliest premigration pseudotime attribute; and computer readable program code which causes said programmable computer processor to determine if said logical volume comprises a premigration pseudotime attribute in said keep until expire range;

computer readable program code which, if said logical volume comprises a premigration pseudotime attribute in said keep until expire range causes said programmable computer processor to determine if said first information storage medium includes only logical volumes having premigration pseudotime attributes in said keep until expire range;

computer readable program code which, if said first information storage medium includes only logical volumes having premigration pseudotime attributes in said keep until expire range, causes said programmable computer processor to determine if a copy of said logical volume is required;

computer readable program code which, if a copy of said logical volume is required causes said programmable computer processor to select a primary copy or a backup copy of said logical volume;

computer readable program code which causes said programmable computer processor to determine if said primary copy was selected;

computer readable program code which, if said primary was selected causes said programmable computer processor to write said primary copy to one or more second information storage media, and to change said premigration pseudotime attribute to a pseudotime earlier than the time said logical volume was formed;

computer readable program code which, if said backup copy was selected, causes said programmable computer processor to write said backup copy to one or more second information storage media;

computer readable program code which, if a copy of said logical volume is not required causes said programmable computer processor to write said logical volume to one or more second information storage media.

51. A computer program product usable with a programmable computer processor having computer readable program code embodied therein to remove one or more logical volumes comprising a stubbing pseudotime attribute from a first information storage medium, comprising:

computer readable program code which causes said programmable computer processor to maintain a plurality of logical volumes in a first information storage medium, wherein each of said plurality of logical volumes comprises a stubbing pseudotime attribute;

computer readable program code which causes said programmable computer processor to select the logical volume with the earliest stubbing pseudotime attribute; and computer readable program code which causes said programmable computer processor to remove said selected logical volume from said first information storage medium.

52. The computer program product of step 51, further comprising:

computer readable program code which causes said programmable computer processor to determine if said logical volume was written to one or more second information storage media; and computer readable program code which, if said logical volume was written to one or more second information storage media, causes said programmable computer processor to set one or more pointers in said first information indicating said one or more second information storage media.

53. The computer program product of step 52, further comprising:

computer readable program code which, if said logical volume was not written to one or more second information storage media, causes said programmable computer processor to maintain said logical volume in said first information storage medium.

54. The computer program product of step 53, further comprising:

computer readable program code which causes said programmable computer processor to define a first range of pseudotimes comprising an export range;

computer readable program code which causes said programmable computer processor to define a second range of pseudotimes comprising a small volume range;

computer readable program code which causes said programmable computer processor to determine if said stubbing pseudotime attribute is in said export range or in said small volume range;

computer readable program code which, if said stubbing pseudotime attribute is not either said export range or said small volume range, causes said programmable computer processor to determine if additional first information storage medium storage capability is needed;

computer readable program code which, if additional first information storage medium storage capability is needed, causes said programmable computer processor to remove said logical volume from said first information storage medium.

55. A computer program product usable with a programmable computer processor having computer readable program code embodied therein to remove one or more logical volumes comprising a stubbing pseudotime attribute from an information storage medium, comprising:

computer readable program code which causes said programmable computer processor to maintain a plurality of logical volumes in a first information storage medium, wherein each of said plurality of logical volumes comprise a stubbing pseudotime attribute;

computer readable program code which causes said programmable computer processor to select the logical volume with the earliest stubbing pseudotime attribute, wherein said logical volume comprises information;

computer readable program code which causes said programmable computer processor to determine if said logical volume is premigrated;

computer readable program code which, if said logical volume is premigrated, causes said programmable computer processor to determine the one or more second information storage media comprising said information;

computer readable program code which causes said programmable computer processor to set one or more pointers in said first information indicating said one or more second information storage media;

computer readable program code which causes said programmable computer processor to remove said selected logical volume from said first information storage medium.

* * * * *